UNITED STATES PATENT OFFICE 2,471,664

TRISAZO DYES

Walter Wehrli and Fritz Kehrer, Basel, Switzerland, assignors to Sandoz Ltd., Fribourg, Switzerland, a Swiss firm No Drawing. Application May 4, 1945, Serial No. 592,064. In Switzerland May 17, 1944

3 Claims. (Cl. 260—173)

The present invention relates to new trisazo dyestuffs which dye cellulosic fibres in blue shades, the fastness of which can be improved by an after-treatment with copper compounds, and to a process for their manufacture.

It has been found that new valuable trisazo dyestuffs can be obtained by coupling 1 mole of 5:5'-dihydroxy - 2:2'-dinaphthylamine - 7:7'-disulphonic acid, on one side, with 1 mole of a diazo compound prepared from an aminoazo dyestuff of the general formula

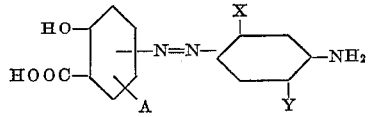

wherein

A stands for hydrogen or alkyl,
X stands for an alkyl or an alkoxy group and
Y stands for an alkoxy group, and, on the other side, with 1 mole of a diazo compound obtained from an o-aminophenol of the formula

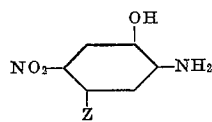

wherein Z stands for hydrogen, alkyl or halogen.

The trisazo dyestuffs obtainable according to the present invention dye cellulosic fibres, like cotton, linen and the like, and fibres from regenerated cellulose in clear blue shades, the fastness of which can be improved by an after-treatment with coppering agents, whereby especially the fastness to light and the wet fastness properties are improved. The new dyestuffs possess an excellent affinity for cellulosic fibres.

The coupling of the 5:5'-dihydroxy-2:2'-dinaphthylamine-7:7'-disulphonic acid can be carried out in the usual way in presence of alkaline compounds, like sodium bicarbonate, sodium carbonate, ammonia or pyridine.

The following example, without being limitative, illustrates the present invention, the parts being by weight:

*Example*

3 parts of 4-amino-2-methyl-5-methoxy-4'-hydroxy-3'-carboxy-1:1'-azobenzene are diazotized in the usual way and coupled in presence of sodium carbonate, while cooling, with 4.6 parts of 5:5'-dihydroxy-2:2'-dinaphthylamine-7:7'-disulphonic acid. The disazo dyestuffs thus obtained is salted out, filtered, dissolved in water with addition of sodium carbonate and coupled in presence of 10 per cent by volume of technical pyridine with the diazo compound prepared from 1.54 parts of 5-nitro-2-amino-1-hydroxybenzene.

The trisazo dyestuff thus obtained is isolated and dried; it dyes cotton and regenerated cellulosic fibres into brilliant reddish-blue shades that become greener, when after-treated with copper compounds, and the fastness to light and the wet fastness properties of which become strongly improved.

The same dyestuff will be obtained, if first diazotized 5-nitro-2-amino-1-hydroxybenzene and then the diazotized aminoazo dyestuff are coupled with the coupling component.

Dyestuffs of similar properties are obtained, if instead of 3 parts of 4-amino-2-methyl-5-methoxy-4'-hydroxy-3'-carboxy-1:1' - azobenzene, 3.2 parts of 4-amino-2:5-dimethoxy-4'-hydroxy-3'-carboxy-1:1'-azobenzene or 3.15 parts of 4-amino-2:5'-dimethyl-5-methoxy-4' - hydroxy-3'-carboxy-1:1'-azobenzene are used.

Similar dyestuffs will also be obtained, if instead of 1.54 parts of 5-nitro-2-amino-1-hydroxybenzene, there are used 1.88 parts of 5-nitro-4-chloro-2-amino-1-hydroxybenzene or 1.68 parts of 5 - nitro-4-methyl-2-amino-1-hydroxybenzene.

What we claim is:

1. The dyestuffs of the general formula

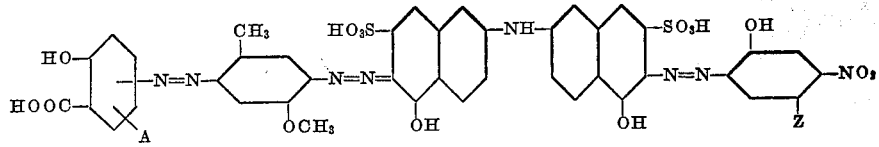

wherein Z stands for a member selected from the group consisting of hydrogen, alkyl and halogen and A stands for a member selected from the group consisting of hydrogen and alkyl, which dyestuffs dye cellulosic fibres in blue shades, which, when after-coppered, become improved in their fastnesses to light and wet treatments.

2. The dyestuff of the formula

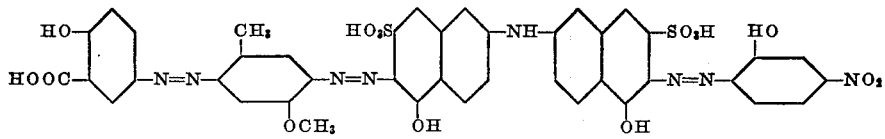

which dyestuff dyes cellulosic fibres in blue shades, which, when after-coppered, become improved in their fastnesses to light and wet treatments.

3. The dyestuff of the formula

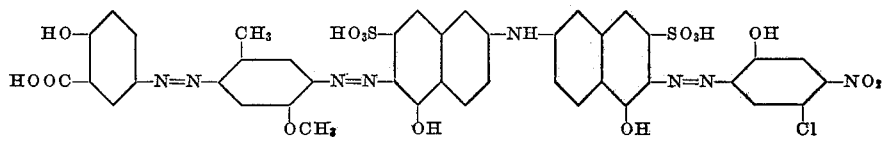

which dyestuff dyes cellulosic fibres in blue shades, which, when after-coppered, become improved in their fastnesses to light and wet treatments.

WALTER WEHRLI.
FRITZ KEHRER.

REFERENCES CITED

The following references are of record in the file of this patent:

UNITED STATES PATENTS

| Number | Name | Date |
|---|---|---|
| 1,265,031 | Anderwert | May 7, 1918 |
| 2,092,429 | Straub et al. | Sept. 7, 1937 |
| 2,369,516 | Anderan | Feb. 13, 1945 |

FOREIGN PATENTS

| Number | Country | Date |
|---|---|---|
| 497,350 | Great Britain | Dec. 19, 1938 |